April 7, 1925.  1,532,995

A. GAGE

LEVEL INDICATOR OF THE LUMINOUS TYPE

Filed March 6, 1924

Inventor
A. Gage
by Langner, Parry, Card & Langner
Attys.

Patented Apr. 7, 1925.

1,532,995

UNITED STATES PATENT OFFICE.

ANDRÉ GAGE, OF ST.-OUEN, FRANCE.

LEVEL INDICATOR OF THE LUMINOUS TYPE.

Application filed March 6, 1924. Serial No. 697,320.

*To all whom it may concern:*

Be it known that I, ANDRÉ GAGE, a citizen of the Republic of France, and residing at St.-Ouen, Seine Department, No. 14 Rue des Bateliers, in the Republic of France, industrial, have invented certain new and useful Improvements in Level Indicators of the Luminous Type, of which the following is a specification.

My invention relates to a level indicator whose readings may be taken with great accuracy and facility by the observation of the point of emergence of a beam of light which traverses the transparent walls of the tube or like vessel of the indicator and is deflected by refraction in various manners according as the said beam traverses the fluid whose level is to be observed or another fluid in contact therewith and having a different index of refraction.

The beam refracted by one of the said fluids may be intercepted, and the illuminant may be so disposed that the disappearance of the emerging point of light will show that the level of the surface of separation of the two fluids has descended below the standard limit.

The appended drawings which are given, by way of example, illustrate an embodiment of the invention.

Figure 1:
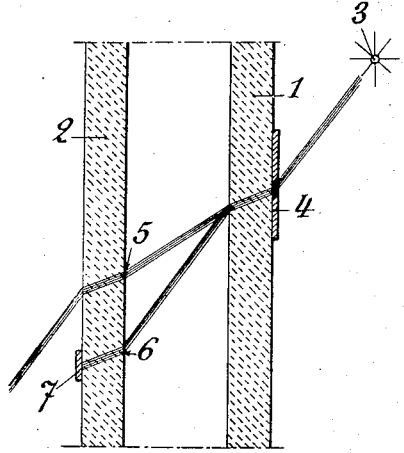
Fig. 1 is a diagrammatic view illustrating the principle of the said apparatus.

The vessel shown in section in Fig. 1 comprises the transparent walls 1 and 2, and it contains the fluid whose level is to be ascertained, water for instance, above which is a fluid having a different index of refraction, such as air.

An illuminant 3 is disposed at one side of the said vessel so as to emit an inclined beam of parallel rays which may pass through an aperture in the screen 4 placed against the wall 1. When traversing the vessel the beam is differently refracted according as the traversed portion contains water or air; the respective points of emergence are indicated at 5 and 6 on the screen 2. It is simply necessary to cover the point of emergence by a screen 7 while the point 5 remains free, in order to obtain a luminous detecting device of a simple character which is responsive to the presence of one or the other of the said fluids.

As a substitute for the said screen, I may dispose upon the wall 2, at the points 5 and 6, suitable glass elements of different colors, or the two refracted beams can be received upon screens which are different or differently colored.

By providing a series of apertures at the upper part of the vessel, I am enabled to form a region corresponding to the rays which are refracted by the water and can issue from the device, and a dark region corresponding to the rays refracted by the air and intercepted by the plain parts situated between the said apertures.

Among the numerous applications of the said method, the use of the same for water gauges upon boilers is of especial interest, as it will obviate the drawback due to the lack of visibility of the indications given by the current types of gauge.

Figure 2:
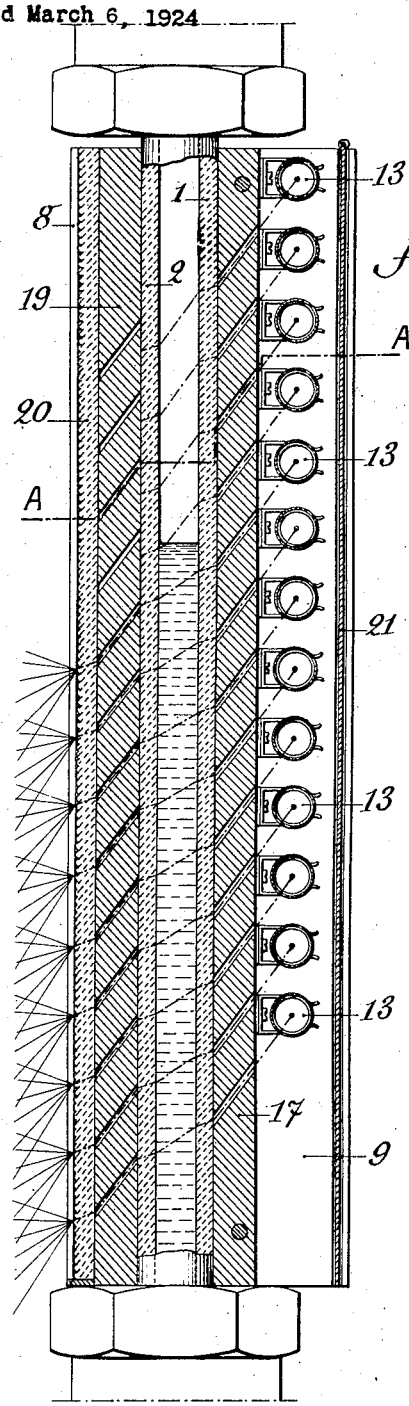
Fig. 2 is a profile elevation of the apparatus, the level gauge properly so called being shown in section.
Figure 3:
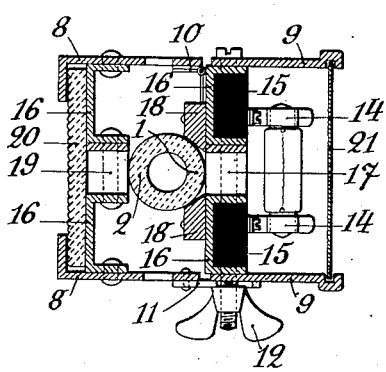
Fig. 3 is a horizontal section of the same, on the line A—A of Fig. 2.

The apparatus shown in Figs. 2 and 3 comprises a two-part rectangular casing 8, 9 pivoting on the hinge 10; the parts can be united by the hooks 11 mounted on the part 8 and the screws with nuts 12 disposed on the part 9.

The lighting means comprise a plurality of incandescent electric lamps 13 mounted in the clamps 14 which are secured to the plates of insulating substance 15; said plates are mounted in the U-shaped members 16 secured to the part 9 of the said casing, between which is disposed an illuminating distributor 17 consisting of a flat plate pierced with inclined slots in number corresponding to the lamps 13 and which are respectively traversed by the beams from the said lamps. The said slots—as also the lamps—are equally spaced apart, and they determine the inclination, width and thickness of the incident beams.

The said device is attached to the gauge tube 1, 2 on one side by the lugs 18 and on the other side by means of the optical selector 19; the latter is analogous to the said distributor and is held between two members 16 secured to the portion 8 of the casing. The said selector affords passage to the emergent rays refracted by the water and cuts off the rays from the lamp 13 or like source. A diffuser 20, consisting for example of a glass plate ground on one side and having thereon a plurality of hemispherical bosses, is disposed against the selector 19, and by its use the indications furnished by the issuing rays after refraction by the water can be observed from a distant point. A cover plate 21, mounted in guides on the part 9, serves to uncover the set of lamps so that the latter can be replaced when out of use without opening the casing.

Obviously, my invention is in no wise limited to the application to boiler gauges as above disclosed by way of example. In particular, it is evident that other classes of waves susceptible of refraction can be substituted for the light waves, such as acoustic, electric, radio-active and other waves.

The said principle may be further applied to the registering of levels by photographic means, or by the use of selenium relays or the like.

The same principle may be further employed for the control of an automatic alarm or signal device showing the excess or the lack of fluid in an industrial apparatus upon which the said luminous gauge is disposed.

Claims—

1. A device for facilitating the observation of a level gauge tube, comprising an illuminant at the side of the tube containing the fluid whose level is to be observed, means disposed between the said illuminant and the said tube whereby the beam is compelled to fall upon the tube at a determined incidence, and means disposed at the other side of the tube and affording passage solely to the incident rays which are refracted through the said fluid.

2. A device for facilitating the observation of a level gauge tube, comprising an illuminant disposed at the side of the tube containing the fluid whose level is to be observed, a distributing element which is suitably apertured and is interposed between the illuminant and the said tube whereby the rays are compelled to fall upon the tube at a determined incidence, and means disposed at the other side of the tube and affording passage solely to the incident rays which are refracted through the said fluid.

3. A device for facilitating the observation of a level gauge tube, comprising an illuminant disposed at the side of the tube containing the fluid whose level is to be observed, a distributing element which is suitably apertured and is interposed between the illuminant and the said tube whereby the rays are compelled to fall upon the tube at a determined incidence, an apertured selecting element disposed at the other side of the tube, the apertures of the two elements being spaced alike but displaced in such manner as to afford passage solely to the incident rays which are refracted through the said fluid.

4. A device for facilitating the observation of a level gauge tube, comprising an illuminant disposed at the side of the tube containing the fluid whose level is to be observed, a distributing element which is suitably apertured and is interposed between the illuminant and the said tube whereby the rays are compelled to fall upon the tube at a determined incidence, and means disposed at the other side of the tube and affording passage solely to the incident rays which are refracted through the said fluid, the illuminant consisting of a series of lamps respectively adjecent the apertures of the said distributing element.

5. A device for facilitating the observation of a level gauge tube, comprising an illuminant disposed at the side of the tube containing the fluid whose level is to be observed, a distributing element which is suitably apertured and is interposed between the illuminant and the said tube whereby the rays are compelled to fall upon the tube at a determined incidence, an apertured selecting element disposed at the other side of the tube, the apertures of the two elements being spaced alike but displaced in such manner as to afford passage to the incident rays which are refracted through the fluid and the said tube, and a diffusing element consisting of a glass plate whose outer face is ground and is provided with suitable projections or bosses, the said diffusing element being placed upon the external face of the said selecting element.

In testimony that I claim the foregoing as my invention, I have signed my name in presence of a subscribing witness.

ANDRÉ GAGE.

Witness:
MAURICE ROUX.